(12) United States Patent
Messimore

(10) Patent No.: US 11,148,791 B2
(45) Date of Patent: Oct. 19, 2021

(54) HYBRID POWER TRI-PROPELLER HELICOPTER APPARATUS

(71) Applicant: Harry Messimore, Claremore, OK (US)

(72) Inventor: Harry Messimore, Claremore, OK (US)

( * ) Notice: Subject to any disclaimer, the term of this patent is extended or adjusted under 35 U.S.C. 154(b) by 285 days.

(21) Appl. No.: 16/454,361

(22) Filed: Jun. 27, 2019

(65) Prior Publication Data

US 2020/0407051 A1 Dec. 31, 2020

(51) Int. Cl.

| | |
|---|---|
| *B64C 27/08* | (2006.01) |
| *B64C 25/04* | (2006.01) |
| *B64C 11/00* | (2006.01) |
| *B64C 25/36* | (2006.01) |
| *B64C 27/20* | (2006.01) |
| *B64D 27/02* | (2006.01) |
| *B64D 27/24* | (2006.01) |
| *B64C 13/04* | (2006.01) |
| *B64D 11/06* | (2006.01) |
| *F02K 1/34* | (2006.01) |
| *B64C 5/06* | (2006.01) |

(52) U.S. Cl.
CPC ............... *B64C 27/08* (2013.01); *B64C 5/06* (2013.01); *B64C 11/001* (2013.01); *B64C 13/04* (2013.01); *B64C 25/04* (2013.01); *B64C 25/36* (2013.01); *B64C 27/20* (2013.01); *B64D 11/0689* (2013.01); *B64D 27/02* (2013.01); *B64D 27/24* (2013.01); *B64D 33/06* (2013.01); *B64D 2027/026* (2013.01)

(58) Field of Classification Search
CPC ....... B64C 27/08; B64C 11/001; B64C 13/04; B64C 25/04; B64D 27/24; B64D 33/06; B64D 2027/026
See application file for complete search history.

(56) References Cited

U.S. PATENT DOCUMENTS

| | | | |
|---|---|---|---|
| 3,184,183 A | 5/1965 | Piasecki | |
| 4,828,203 A | 5/1989 | Clifton | |
| 5,454,531 A | 10/1995 | Melkuti | |
| 6,464,166 B1 | 10/2002 | Yocli | |
| 6,575,402 B1* | 6/2003 | Scott | ...................... B64C 27/20 |
| | | | 244/12.2 |
| 2006/0192046 A1* | 8/2006 | Heath | .................... B64D 35/04 |
| | | | 244/12.3 |
| 2007/0057113 A1* | 3/2007 | Parks | .................. B64C 29/0041 |
| | | | 244/12.5 |

(Continued)

*Primary Examiner* — Joshua J Michener
*Assistant Examiner* — Cindi M Curry

(57) ABSTRACT

A hybrid power tri-propeller helicopter apparatus for efficient and quiet flying includes a helicopter body, a cockpit portion, an engine portion, a tail boom portion, a gas motor, a generator, a battery pack, and an electric nose motor. A nose propeller and a lift propeller support are coupled to the helicopter body. A pair of electric lift motors is coupled to the lift propeller support and is in operational communication with the battery pack. A pair of lift propellers is coupled to the pair of lift motors. A tail fin and a pair of horizontal rear stabilizer fins are coupled to the tail boom portion. A pair of front stabilizer fins is coupled to the cockpit portion. A plurality of controls is coupled to the cockpit portion and is in operational communication with the nose motor, the pair of lift motors, and the pair of rear stabilizer fins.

8 Claims, 3 Drawing Sheets

(56) References Cited

U.S. PATENT DOCUMENTS

| | | | |
|---|---|---|---|
| 2013/0020429 A1* | 1/2013 | Kroo | B64C 3/16 |
| | | | 244/6 |
| 2016/0200436 A1* | 7/2016 | North | B64C 25/52 |
| | | | 244/7 R |
| 2018/0334251 A1* | 11/2018 | Karem | B64C 3/10 |
| 2019/0084684 A1* | 3/2019 | Eller | B64D 27/24 |
| 2019/0329882 A1* | 10/2019 | Baity | B64C 29/0033 |

* cited by examiner

HYBRID POWER TRI-PROPELLER HELICOPTER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to helicopters and more particularly pertains to a new helicopter for efficient and quiet flying.

BRIEF SUMMARY OF THE INVENTION

An embodiment of the disclosure meets the needs presented above by generally comprising a helicopter body having a nose end, a tail end, a body top side, a body bottom side, a body right side, a body left side, a cockpit portion, an engine portion, and a tail boom portion. A gas motor is coupled to the helicopter body within the engine portion. A generator is coupled to the helicopter body within the engine portion and is in operational communication with the gas motor. A battery pack is coupled to the helicopter body within the body bottom side and is in operational communication with the generator. An electric nose motor is coupled to the helicopter body within the nose end and is in operational communication with the battery pack. A nose propeller is coupled to the helicopter body. The nose propeller is coupled to the nose end and is in operational communication with the nose motor. A lift propeller support is coupled to the body top side behind the cockpit portion and has a right end extending past the body right side and a left end extending past the body left side. A pair of electric lift motors is coupled to the lift propeller support. The pair of lift motors comprise a left lift motor and a right lift motor coupled to the left end and the right end, respectively. The pair of lift motors is in operational communication with the battery pack. A pair of lift propellers is coupled to the pair of lift motors and is in operational communication with the pair of lift motors. A tail fin is coupled to the tail boom portion adjacent the tail end. The tail fin has a vertical stabilizer flap. A pair of horizontal rear stabilizer fins is coupled to the helicopter body. The pair of rear stabilizer fins comprises a left rear stabilizer fin and a right rear stabilizer fin coupled to the body left side and the body right side of the tail boom portion, respectively. Each of the pair of rear stabilizer fins has an elevator flap. A pair of front horizontal stabilizer fins is coupled to the helicopter body. The pair of front stabilizer fins comprises a left front stabilizer fin and right front stabilizer fin coupled to the body left side and the body right side below the cockpit portion. A landing skid is coupled to the body bottom side. A plurality of controls is coupled to the helicopter body within the cockpit portion. The plurality of controls is in operational communication with the nose motor, the pair of lift motors, the vertical stabilizer flap, and the elevator flap of each of the pair of rear stabilizer fins. A seat is coupled to the helicopter body within the cockpit portion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
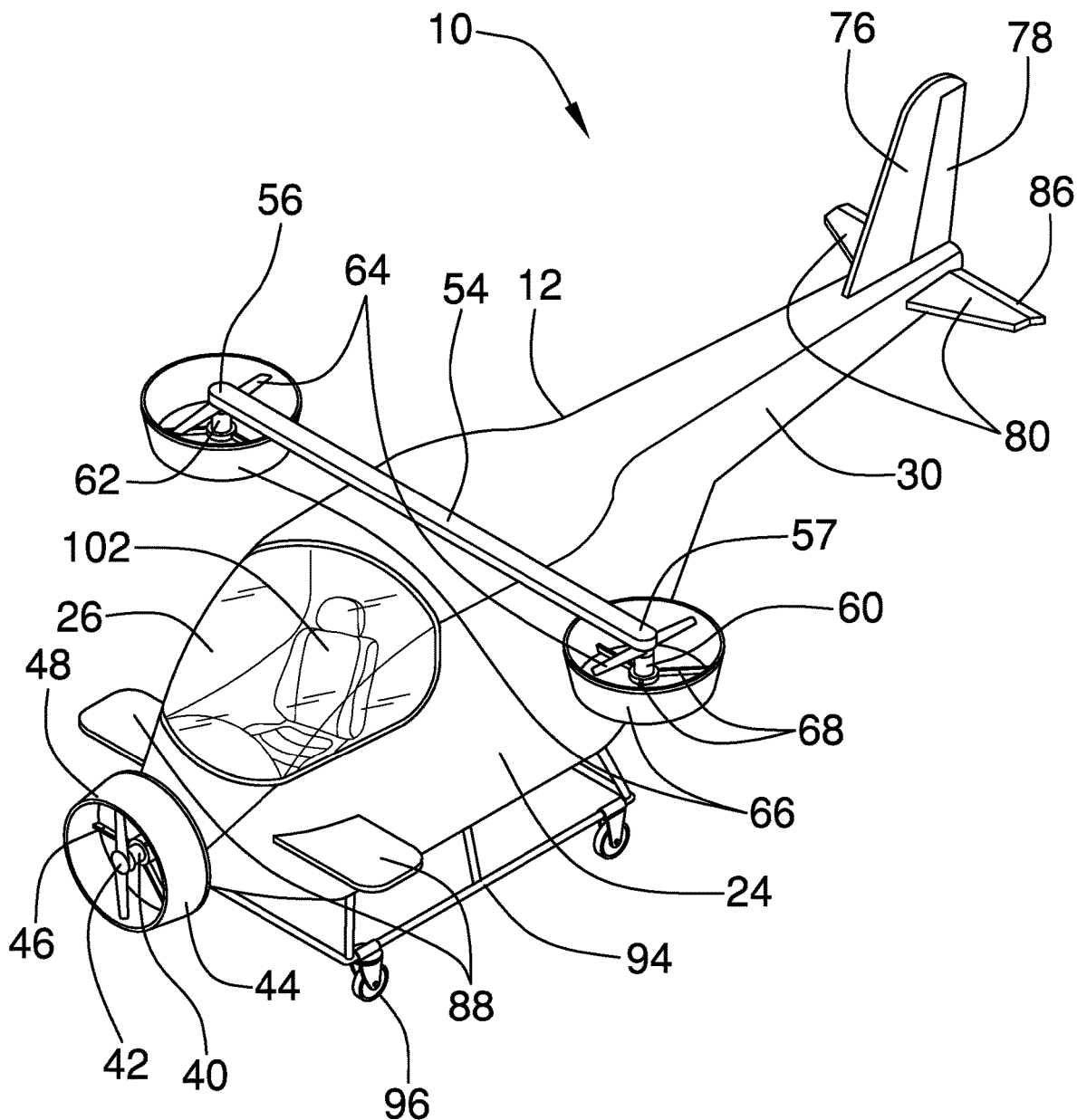
FIG. 1 is an isometric view of a hybrid power tri-propeller helicopter apparatus according to an embodiment of the disclosure.
Figure 2:
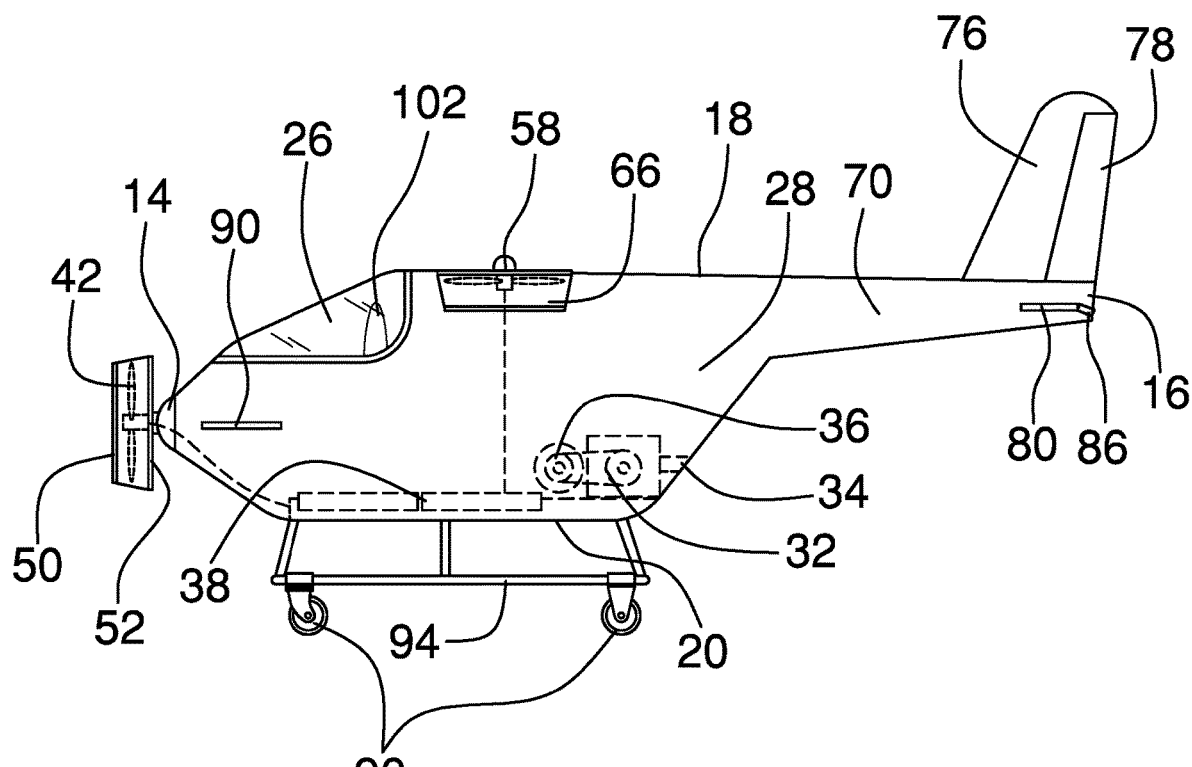
FIG. 2 is a side elevation view of an embodiment of the disclosure.
Figure 3:
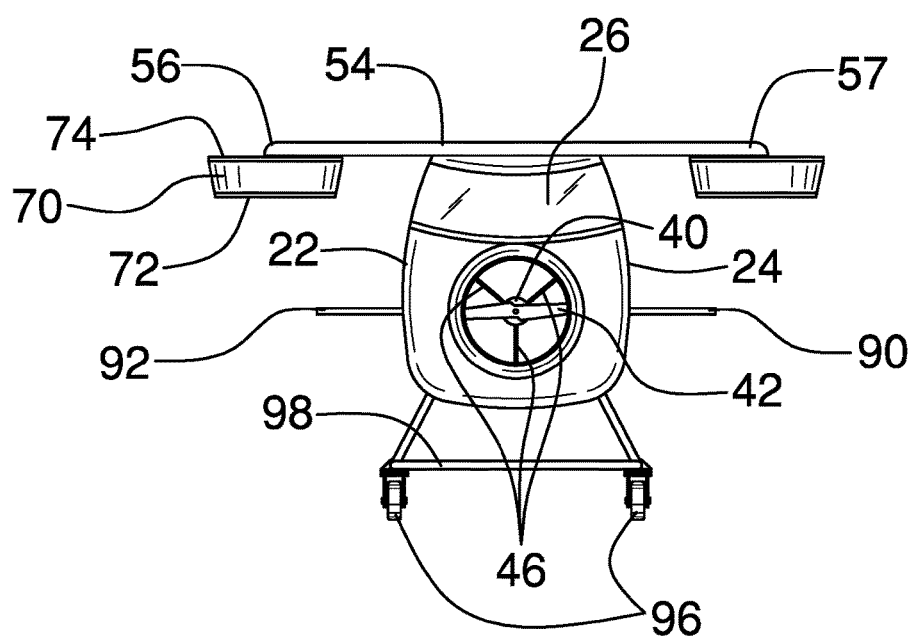
FIG. 3 is a front elevation view of an embodiment of the disclosure.
Figure 4:
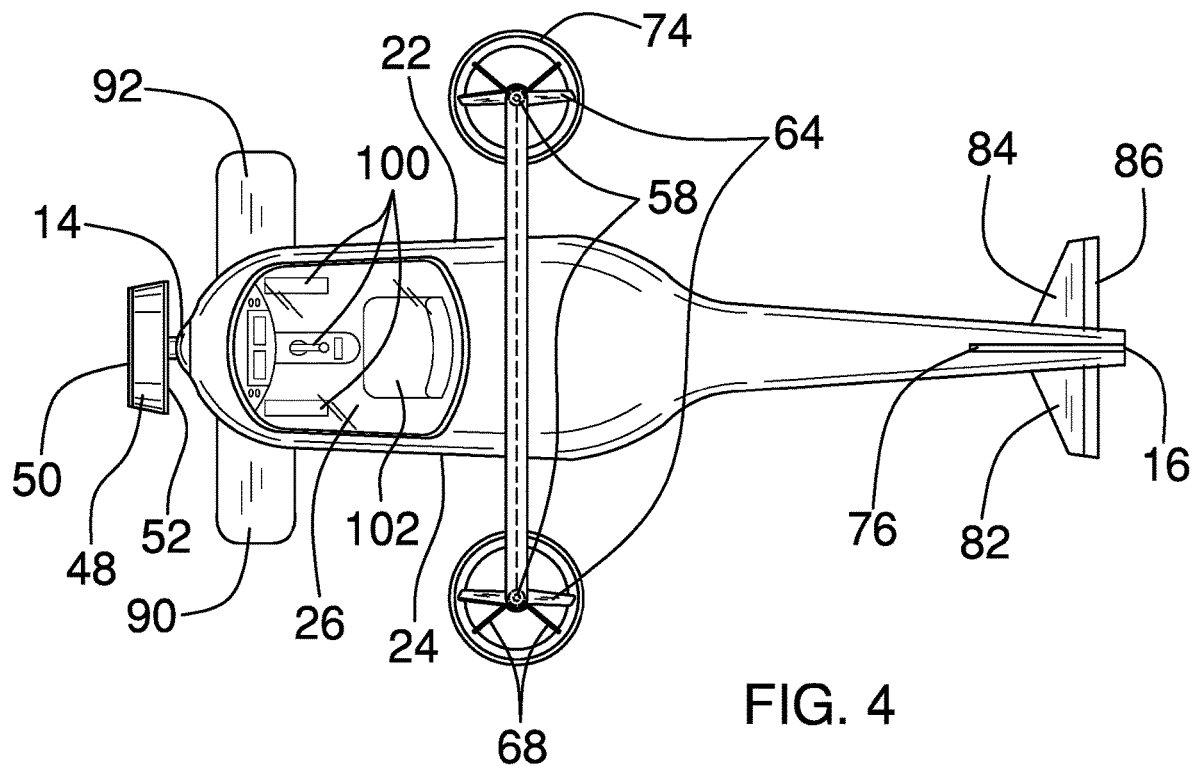
FIG. 4 is a top plan view of an embodiment of the disclosure.
Figure 5:
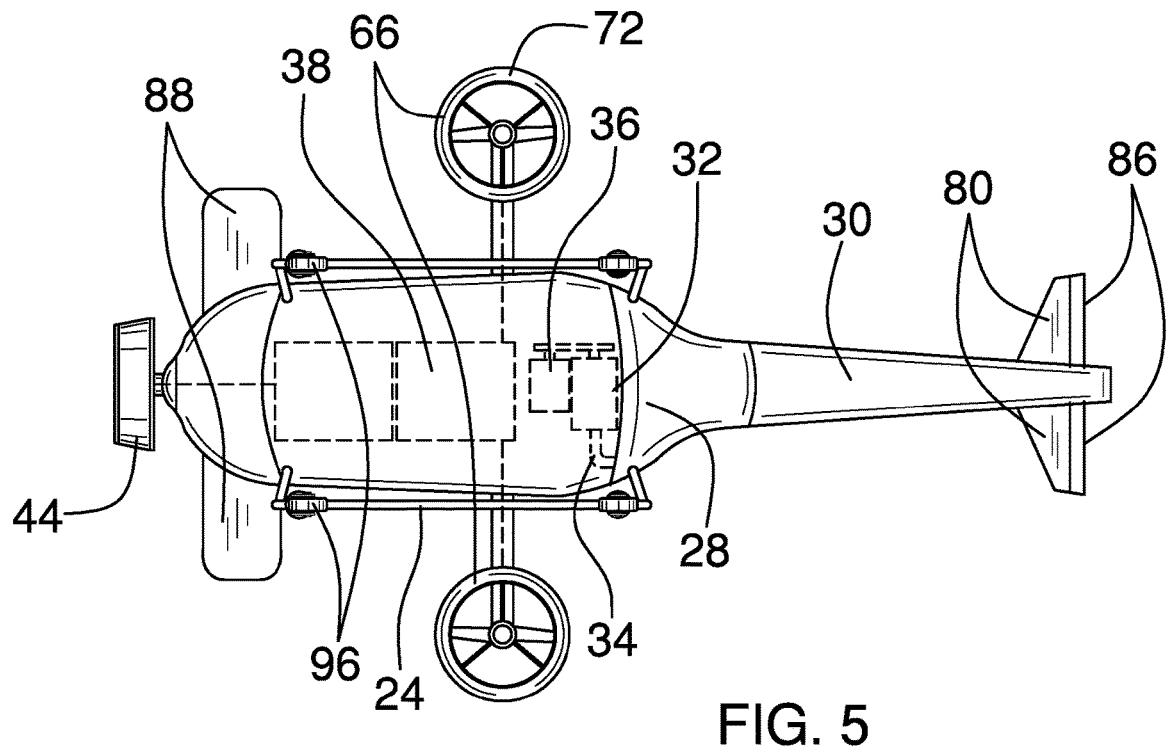
FIG. 5 is a bottom plan view of an embodiment of the disclosure.

With reference now to the drawings, and in particular to FIGS. 1 through 5 thereof, a new helicopter embodying the principles and concepts of an embodiment of the disclosure and generally designated by the reference numeral 10 will be described.

As best illustrated in FIGS. 1 through 5, the hybrid power tri-propeller helicopter apparatus 10 generally comprises a helicopter body 12 having a nose end 14, a tail end 16, a body top side 18, a body bottom side 20, a body right side 22, a body left side 24, a cockpit portion 26, an engine portion 28, and a tail boom portion 30. A gas motor 32 is coupled to the helicopter body 12 within the engine portion 28. A muffler 34 is coupled to the gas motor 32. A generator 36 is coupled to the helicopter body 12 within the engine portion 28 and is in operational communication with the gas motor 32. A battery pack 38 is coupled within the body bottom side 20 and is in operational communication with the generator 36. An electric nose motor 40 is coupled within the nose end 14 and is in operational communication with the battery pack 38. A nose propeller 42 is coupled to the nose end 14 and is in operational communication with the nose motor 40. A nose propeller shroud 44 is coupled to the nose motor 40 and has a plurality of nose support bars 46 extending from the nose propeller 42 and an angled nose duct 48 is coupled to the plurality of nose support bars 46. A diameter of the nose propeller 42 is greater than a diameter of a front rim 50 of the nose duct 48 and less than a diameter of a back rim 52 of the nose duct 48. A lift propeller support 54 is coupled to the body top side 18 behind the cockpit portion 26 and has a right end 56 extending past the body right side 22 and a left end 57 extending past the body left side 24. A pair of electric lift motors 58 is coupled to the lift propeller support 54 and comprises a left lift motor 60 and a right lift motor 62 coupled to the left end 57 and the right end 56, respectively. The pair of lift motors 58 is in operational communication with the battery pack 38. A pair of lift propellers 64 is coupled to the pair of lift motors 58 and is in operational communication with the pair of lift motors 58. A pair of lift propeller shrouds 66 is coupled to the pair of lift propellers 64. Each of the pair of lift propeller shrouds 66 has a plurality of lift support bars 68 extending from the respective lift propeller 64 and an angled lift duct 70 coupled to the plurality of lift support bars 68. A diameter of each of the lift propellers 64 is greater than a diameter of a lower rim 72 of each lift duct 70 and less than a diameter of an upper rim 74 of each lift duct 70. The upper rim 74 of each lift duct 70 lies in a plane coplanar with a plane of the body top side 18. A tail fin 76 is coupled to the tail boom portion 30 adjacent the tail end 16. The tail fin 76 has a vertical stabilizer flap 78. A pair of horizontal rear stabilizer fins 80 is coupled to the helicopter body 12 and comprises a left rear stabilizer fin 82 and a right rear stabilizer fin 84 coupled to the body left side 24 and the body right side 22 of the tail boom portion 30, respectively. Each of the pair of rear stabilizer fins 80 has an elevator flap 86. A pair of front horizontal stabilizer fins 88 is coupled to the helicopter body 12 and comprises a left front stabilizer fin 90 and right front stabilizer fin 92 coupled to the body left side 24 and the body right side 22 below the cockpit portion 26. A width of the pair of front stabilizer fins 88 is greater than a width of the pair of rear stabilizer fins 80 and less than a width of lift propeller support 54. A landing skid 94 is coupled to the body bottom side 20. A plurality of wheels 96 is coupled to a lower perimeter 98 of the landing skid 94. A plurality of controls 100 is coupled within the cockpit portion 26 and is in operational communication with the nose motor 40, the pair of lift motors 58, the vertical stabilizer flap 78, and the elevator flap 86 of each of the pair of rear stabilizer fins 80. A seat 102 is coupled within the cockpit portion 26.

In use, a user sits on the seat 102 in the cockpit portion 26 and uses the plurality of controls 100 to activate the nose motor 40, the pair of lift motors 58, the vertical stabilizer flap 78, and the elevator flap 86 of each of the pair of rear stabilizer fins 80 to take off and land on the landing skid 94.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A hybrid power tri-propeller helicopter apparatus comprising:
   a helicopter body, the helicopter body having a nose end, a tail end, a body top side, a body bottom side, a body right side, and a body left side, a cockpit portion, an engine portion, and a tail boom portion;
   a gas motor coupled to the helicopter body, the gas motor being coupled within the engine portion;
   a generator coupled to the helicopter body, the generator being coupled within the engine portion and in operational communication with the gas motor;
   a battery pack coupled to the helicopter body, the battery back being coupled within the body bottom side and in operational communication with the generator;
   an electric nose motor coupled to the helicopter body, the nose motor being coupled within the nose end and in operational communication with the battery pack;
   a nose propeller coupled to the helicopter body, the nose propeller being coupled to the nose end and in operational communication with the nose motor;
   a lift propeller support coupled to the helicopter body, the lift propeller support being coupled to the body top side behind the cockpit portion and having a right end extending past the body right side and a left end extending past the body left side;
   a pair of electric lift motors coupled to the lift propeller support, the pair of lift motors comprising a left lift motor and a right lift motor coupled to the left end and the right end, respectively, the pair of lift motors being in operational communication with the battery pack;
   a pair of lift propellers coupled to the pair of lift motors, the pair of lift propellers being in operational communication with the pair of lift motors;
   a tail fin coupled to the helicopter body, the tail fin being coupled to the tail boom portion adjacent the tail end, the tail fin having a vertical stabilizer flap;
   a pair of horizontal rear stabilizer tins coupled to the helicopter body, the pair of rear stabilizer fins comprising a left rear stabilizer fin and a right rear stabilizer fin coupled to the body left side and the body right side of the tail boom portion, respectively, each of the pair of rear stabilizer fins having an elevator flap;
   a pair of front horizontal stabilizer fins coupled to the helicopter body, the pair of front stabilizer fins com- prising a left front stabilizer fin and right front stabilizer fin coupled to the body left side and the body right side below the cockpit portion;
a landing skid coupled to the helicopter body, the landing skid being coupled to the body bottom side;
a plurality of controls coupled to the helicopter body, the plurality of controls being coupled within the cockpit portion, the plurality of controls being in operational communication with the nose motor, the pair of lift motors, the vertical stabilizer flap, and the elevator flap of each of the pair of rear stabilizer fins;
a seat coupled to the helicopter body, the seat being coupled within the cockpit portion; and
a width of the pair of front stabilizer fins being greater than a width of the pair of rear stabilizer fins and less than a width of lift propeller support.

2. The hybrid power tri-propeller helicopter apparatus of claim 1 further comprising a nose propeller shroud coupled to the nose motor and a pair of lift propeller shrouds coupled to the pair of lift propellers.

3. A hybrid power tri-propeller helicopter apparatus comprising:
a helicopter body, the helicopter body having a nose end, a tail end, a body top side, a body bottom side, a body right side, and a body left side, a cockpit portion, an engine portion, and a tail boom portion;
a gas motor coupled to the helicopter body, the gas motor being coupled within the engine portion;
a generator coupled to the helicopter body, the generator being coupled within the engine portion and in operational communication with the gas motor;
a battery pack coupled to the helicopter body, the battery back being coupled within the body bottom side and in operational communication with the generator;
an electric nose motor coupled to the helicopter body, the nose motor being coupled within the nose end and in operational communication with the battery pack;
a nose propeller coupled to the helicopter body, the nose propeller being coupled to the nose end and in operational communication with the nose motor;
a lift propeller support coupled to the helicopter body, the lift propeller support being coupled to the body top side behind the cockpit portion and having a right end extending past the body right side and a left end extending past the body left side;
a pair of electric lift motors coupled to the lift propeller support, the pair of lift motors comprising a left lift motor and a right lift motor coupled to the left end and the right end, respectively, the pair of lift motors being in operational communication with the battery pack;
a pair of lift propellers coupled to the pair of lift motors, the pair of lift propellers being in operational communication with the pair of lift motors;
a tail fin coupled to the helicopter body, the tail fin being coupled to the tail boom portion adjacent the tail end, the tail fin having a vertical stabilizer flap;
a pair of horizontal rear stabilizer fins coupled to the helicopter body, the pair of rear stabilizer fins comprising a left rear stabilizer fin and a right rear stabilizer fin coupled to the body left side and the body right side of the tail boom portion, respectively, each of the pair of rear stabilizer fins having an elevator flap;
a pair of front horizontal stabilizer fins coupled to the helicopter body, the pair of front stabilizer fins comprising a left front stabilizer fin and right front stabilizer fin coupled to the body left side and the body right side below the cockpit portion;
a landing skid coupled to the helicopter body, the landing skid being coupled to the body bottom side;
a plurality of controls coupled to the helicopter body, the plurality of controls being coupled within the cockpit portion, the plurality of controls being in operational communication with the nose motor, the pair of lift motors, the vertical stabilizer flap, and the elevator flap of each of the pair of rear stabilizer fins;
a seat coupled to the helicopter body, the seat being coupled within the cockpit portion; and
a nose propeller shroud coupled to the nose motor and a pair of lift propeller shrouds coupled to the pair of lift propellers, the nose propeller shroud having a plurality of nose support bars extending from the nose propeller and an angled nose duct coupled to the plurality of nose support bars, each of the pair of lift propeller shrouds having a plurality of lift support bars extending from the respective lift propeller and an angled lift duct coupled to the plurality of lift support bars.

4. The hybrid power tri-propeller helicopter apparatus of claim 3 further comprising a diameter of the nose propeller being greater than a diameter of a front rim of the nose duct and less than a diameter of a back rim of the nose duct, a diameter of each of the lift propellers being greater than a diameter of a lower rim of each lift duct and less than a diameter of an upper rim of each lift duct.

5. The hybrid power tri-propeller helicopter apparatus of claim 4 further comprising the upper rim of each lift duct lying in a plane coplanar with a plane of the body top side.

6. The hybrid power tri-propeller helicopter apparatus of claim 1 further comprising a muffler coupled to the gas motor.

7. A hybrid power tri-propeller helicopter apparatus comprising:
a helicopter body, the helicopter body having a nose end, a tail end, a body top side, a body bottom side, a body right side, and a body left side, a cockpit portion, an engine portion, and a tail boom portion;
a gas motor coupled to the helicopter body, the gas motor being coupled within the engine portion;
a generator coupled to the helicopter body, the generator being coupled within the engine portion and in operational communication with the gas motor;
a battery pack coupled to the helicopter body, the battery back being coupled within the body bottom side and in operational communication with the generator;
an electric nose motor coupled to the helicopter body, the nose motor being coupled within the nose end and in operational communication with the battery pack;
a nose propeller coupled to the helicopter body, the nose propeller being coupled to the nose end and in operational communication with the nose motor;
a lift propeller support coupled to the helicopter body, the lift propeller support being coupled to the body top side behind the cockpit portion and having a right end extending past the body right side and a left end extending past the body left side;
a pair of electric lift motors coupled to the lift propeller support, the pair of lift motors comprising a left lift motor and a right lift motor coupled to the left end and the right end, respectively, the pair of lift motors being in operational communication with the battery pack;
a pair of lift propellers coupled to the pair of lift motors, the pair of lift propellers being in operational communication with the pair of lift motors;

a tail fin coupled to the helicopter body, the tail fin being coupled to the tail boom portion adjacent the tail end, the tail fin having a vertical stabilizer flap;

a pair of horizontal rear stabilizer fins coupled to the helicopter body, the pair of rear stabilizer fins comprising a left rear stabilizer fin and a right rear stabilizer tin coupled to the body left side and the body right side of the tail boom portion, respectively, each of the pair of rear stabilizer fins having an elevator flap;

a pair of front horizontal stabilizer tins coupled to the helicopter body, the pair of front stabilizer fins comprising a left front stabilizer fin and right front stabilizer fin coupled to the body left side and the body right side below the cockpit portion;

a landing skid coupled to the helicopter body, the landing skid being coupled to the body bottom side;

a plurality of controls coupled to the helicopter body, the plurality of controls being coupled within the cockpit portion, the plurality of controls being in operational communication with the nose motor, the pair of lift motors, the vertical stabilizer flap, and the elevator flap of each of the pair of rear stabilizer fins;

a seat coupled to the helicopter body, the seat being coupled within the cockpit portion; and a plurality of wheels coupled to a lower perimeter of the landing skid.

8. The hybrid power tri-propeller helicopter apparatus of claim 7, further comprising:

a muffler coupled to the gas motor;

a nose propeller shroud coupled to the nose motor, the nose propeller shroud having a plurality of nose support bars extending from the nose propeller and an angled nose duct coupled to the plurality of nose support bars, a diameter of the nose propeller being greater than a diameter of a front rim of the nose duct and less than a diameter of a back rim of the nose duct;

a pair of lift propeller shrouds coupled to the pair of lift propellers, each of the pair of lift propeller shrouds having a plurality of lift support bars extending from the respective lift propeller and an angled lift duct coupled to the plurality of lift support bars, a diameter of each of the lift propellers being greater than a diameter of a lower rim of each lift duct and less than a diameter of an upper rim of each lift duct, the upper rim of each lift duct tying in a plane coplanar with a plane of the body top side; and a width of the pair of front stabilizer fins being greater than a width of the pair of rear stabilizer fins and less than a width of lift propeller support.

* * * * *